(12) United States Patent
Samson (10) Patent No.: US 7,698,575 B2
(45) Date of Patent: Apr. 13, 2010

(54) MANAGING POWER CONSUMPTION BY REQUESTING AN ADJUSTMENT TO AN OPERATING POINT OF A PROCESSOR

(75) Inventor: Eric C. Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 10/814,425

(22) Filed: Mar. 30, 2004

(65) Prior Publication Data

US 2005/0223249 A1    Oct. 6, 2005

(51) Int. Cl.
*G06F 1/00* (2006.01)
*G06F 1/26* (2006.01)
*G06F 1/32* (2006.01)
*G06T 1/00* (2006.01)

(52) U.S. Cl. ............... 713/300; 713/320; 713/322; 345/418

(58) Field of Classification Search .......... 713/300, 713/320, 322; 345/418
See application file for complete search history.

(56) References Cited

U.S. PATENT DOCUMENTS

| | | |
|---|---|---|
| 4,485,440 A | 11/1984 | Duff et al. |
| 5,021,679 A | 6/1991 | Fairbanks et al. |
| 5,072,376 A | 12/1991 | Ellsworth |
| 5,153,535 A | 10/1992 | Fairbanks et al. |
| 5,307,003 A | 4/1994 | Fairbanks et al. |
| 5,349,688 A | 9/1994 | Nguyen |
| 5,404,543 A | 4/1995 | Faucher et al. |
| 5,513,358 A | 4/1996 | Lundberg et al. |
| 5,564,015 A | 10/1996 | Bunnell |
| 5,623,647 A | 4/1997 | Maitra |
| 5,625,806 A | 4/1997 | Kromer |
| 5,627,412 A | 5/1997 | Beard |
| 5,710,929 A | 1/1998 | Fung |
| 5,719,800 A | 2/1998 | Mittal et al. |
| 5,745,375 A | 4/1998 | Reinhardt et al. |
| 5,752,011 A | 5/1998 | Thomas et al. |
| 5,781,768 A * | 7/1998 | Jones, Jr. .................. 713/501 |
| 5,787,294 A | 7/1998 | Evoy |
| 5,813,022 A | 9/1998 | Ramsey et al. |
| 5,815,693 A | 9/1998 | McDermott et al. |
| 5,825,674 A | 10/1998 | Jackson |
| 5,963,023 A | 10/1999 | Herrell et al. |

(Continued)

FOREIGN PATENT DOCUMENTS

EP    0 978 781 A2    2/2000

(Continued)

OTHER PUBLICATIONS

Hamilton, Anthony, U.S. Appl. No. 09/677,261, filed Sep. 30, 2000.

(Continued)

*Primary Examiner*—Ji H Bae
(74) *Attorney, Agent, or Firm*—Kacvinsky LLC (57) ABSTRACT

A processor is provided with a workload that has a real-time demand. A processor clock frequency requirement is set for the processor, based on a deadline margin for the real-time demand. Other embodiments are also described and claimed.

20 Claims, 3 Drawing Sheets

U.S. PATENT DOCUMENTS

| | | | |
|---|---|---|---|
| 5,974,557 | A | 10/1999 | Thomas et al. |
| 5,982,814 | A | 11/1999 | Yeh et al. |
| 6,006,336 | A | 12/1999 | Watts et al. |
| 6,105,142 | A | 8/2000 | Goff et al. |
| 6,108,226 | A | 8/2000 | Ghosh et al. |
| 6,118,306 | A | 9/2000 | Orton et al. |
| 6,128,747 | A | 10/2000 | Thoulon |
| 6,141,762 | A * | 10/2000 | Nicol et al. ............. 713/300 |
| 6,141,765 | A | 10/2000 | Sherman |
| 6,192,479 | B1 | 2/2001 | Ko |
| 6,212,644 | B1 | 4/2001 | Shimoda et al. |
| 6,216,235 | B1 | 4/2001 | Thomas et al. |
| 6,272,642 | B2 | 8/2001 | Pole, II et al. |
| 6,298,105 | B1 | 10/2001 | Dai et al. |
| 6,313,838 | B1 * | 11/2001 | Deering ............. 345/420 |
| 6,347,379 | B1 | 2/2002 | Dai et al. |
| 6,351,150 | B1 | 2/2002 | Krishnamurthy et al. |
| 6,397,343 | B1 * | 5/2002 | Williams et al. ............. 713/501 |
| 6,470,456 | B1 | 10/2002 | Chung-Chih |
| 6,487,668 | B2 | 11/2002 | Thomas et al. |
| 6,519,706 | B1 | 2/2003 | Ogoro |
| 6,535,798 | B1 | 3/2003 | Bhatia et al. |
| 6,557,108 | B1 | 4/2003 | Moore et al. |
| 6,574,739 | B1 | 6/2003 | Kung et al. |
| 6,633,987 | B2 | 10/2003 | Jain et al. |
| 6,657,634 | B1 * | 12/2003 | Sinclair et al. ............. 345/534 |
| 6,691,236 | B1 * | 2/2004 | Atkinson ............. 713/320 |
| 6,738,675 | B2 | 5/2004 | Dai |
| 6,758,752 | B1 * | 7/2004 | Miyagawa ............. 463/31 |
| 6,820,209 | B1 * | 11/2004 | Culbert et al. ............. 713/501 |
| 6,829,713 | B2 | 12/2004 | Cooper et al. |
| 6,938,176 | B1 * | 8/2005 | Alben et al. ............. 713/323 |
| 6,941,480 | B1 | 9/2005 | Dai |
| 6,950,105 | B2 * | 9/2005 | Giemborek et al. ......... 345/501 |
| 6,950,106 | B2 * | 9/2005 | Torii et al. ............. 345/506 |
| 7,085,944 | B1 | 8/2006 | Hamilton |
| 7,256,788 | B1 * | 8/2007 | Luu et al. ............. 345/501 |
| 7,343,502 | B2 | 3/2008 | Samson et al. |
| 2001/0029566 | A1 | 10/2001 | Shin ............. 711/105 |
| 2002/0130870 | A1 * | 9/2002 | Ebihara ............. 345/440 |
| 2003/0115428 | A1 | 6/2003 | Zaccarin et al. |
| 2003/0210247 | A1 * | 11/2003 | Cui et al. ............. 345/534 |
| 2003/0233592 | A1 * | 12/2003 | Lin et al. ............. 713/320 |
| 2004/0139359 | A1 | 7/2004 | Samson et al. |
| 2004/0175598 | A1 * | 9/2004 | Bliven et al. ............. 429/12 |
| 2005/0022038 | A1 | 1/2005 | Kaushik et al. |
| 2005/0195181 | A1 * | 9/2005 | Khodorkovsky ............. 345/211 |

FOREIGN PATENT DOCUMENTS

| | | |
|---|---|---|
| EP | 1 115 051 A1 | 7/2001 |
| EP | 1 369 767 A2 | 12/2003 |

OTHER PUBLICATIONS

Dai, Xia, U.S. Appl. No. 09/677,263, filed Sep. 30, 2000.

Intel Corporation, "IA-32 Processors and Related Products Databook"; Chapter 1; pp. 1-1-1-20; Mar. 1999.

Intel Corporation, "IA-32 Processors and Related Products Databook"; Appendix A; pp. 1-53-1-69; Mar. 1999.

Intel Corporation, "IA-32 Processors and Related Products Databook"; Chapter 7; pp. 7-161-7-224; Mar. 1999.

Intel Corporation, "Intel Architecture Software Developer's Manual; vol. 1: Basic Architecture"; Chapter 2; pp. 2-1-2-14; 1999.

Intel Corporation, "Mobile Intel® Pentium® 4 Processors—M: Enhanced Intel SpeedStep® Technology"; 3 pages; Dec. 9, 2003.

Intel Corporation, "Mobile Intel® Pentium® III Processors—M: Intel SpeedStep® Technology"; 3 pages; Dec. 9, 2003.

Intel Corporation, "Mobile Intel® Pentium® 4 Processor—M: Datasheet"; 97 pages; Jun. 2003.

Youngsoo Shin et al., "Power Conscious Fixed Priority Scheduling for Hard Real-Time Systems," Proceedings of the 36$^{th}$ Design Automation Conference, pp. 134-139, Jun. 21, 1999.

European Patent Office, International Search Report and Written Opinion for International Application No. PCT/US2005/010163, 15 pages, Sep. 30, 2005.

* cited by examiner

FIG. 1

Double Bufferred Rendering

MANAGING POWER CONSUMPTION BY REQUESTING AN ADJUSTMENT TO AN OPERATING POINT OF A PROCESSOR

BACKGROUND

An embodiment of the invention relates to management of power consumption in an electronic system, by making adjustments to an operating point of a processor in the system, based on a deadline margin for a real-time demand. Other embodiments are also described and claimed.

Power consumption management in electronic computing systems has become a hot topic, especially with portable systems such as notebook computers that are battery-powered (and hence have a limited supply of energy). As portable systems continue to expand their functions and consume more power, different techniques have been developed to better manage their power consumption, e.g. reduce their power consumption whenever possible.

Manufacturers of a computer system's clocked processor elements, such as a central processing unit (CPU) and a graphics processor (or controller), have built into these elements a mechanism that allows its performance capability or operating point to be adjusted on command. For example, the SpeedStep® technology by Intel Corp., Santa Clara, Calif., allows software that is running in the system to dynamically request a changes in the CPU clock frequency and operating voltage based on factors such as CPU processor utilization, when a power source for the system changes, e.g. from line power to battery. In such an algorithm, a new processor clock frequency is determined by applying a scaling factor to the current or actual frequency. The scaling factor was computed based on the most recent "use" of the processor. For example, if the processor was busy only 25% of the time (while performing a given workload), then the frequency may be gradually scaled down to about 25% of its current value. This reduction will reduce power consumption without compromising the timely completion of the workload, provided of course that the workload does not increase significantly.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

In many instances, a computer system processor is provided a workload that has a real-time demand. For example, an operating system program might specify a minimum, video frame rate for displaying images (or sometimes referred to as image frames) on a monitor of the system. In such a case, it has been determined that failing to consider the CPU and graphics section together, in making each operating point transition decision, may lead to frame dropping (due to a processor clock frequency that is not sufficiently high). In addition, applying the use-based methodology described above (to set a processor clock frequency requirement for the CPU and/or the graphics controller) could also result in frame dropping by making incorrect adjustments to the processor clock frequency.

According to an embodiment of the invention, a processor clock frequency requirement is set based on a deadline margin for real-time demand. Deadline margin may be loosely defined as the time between when a task is finished and its deadline. In other words, rather than determine how busy the processor has been (when about to update an operating point requirement), this embodiment of the invention considers how close the completion of a given task by the processor has come to its deadline. The processor may be a CPU or a graphics controller of a computer system, while the real-time demand may be a target frame rate for displaying video in the system. Such a methodology may be used to better manage power consumption in the system, while at the same time providing enough computing power to avoid dropped frames by a graphics processing scheme. Other computing applications, such as a sequential or cascaded processing scheme involving two or more processors (e.g., CPU and graphics section), may also benefit from such a methodology.

Figure 1:
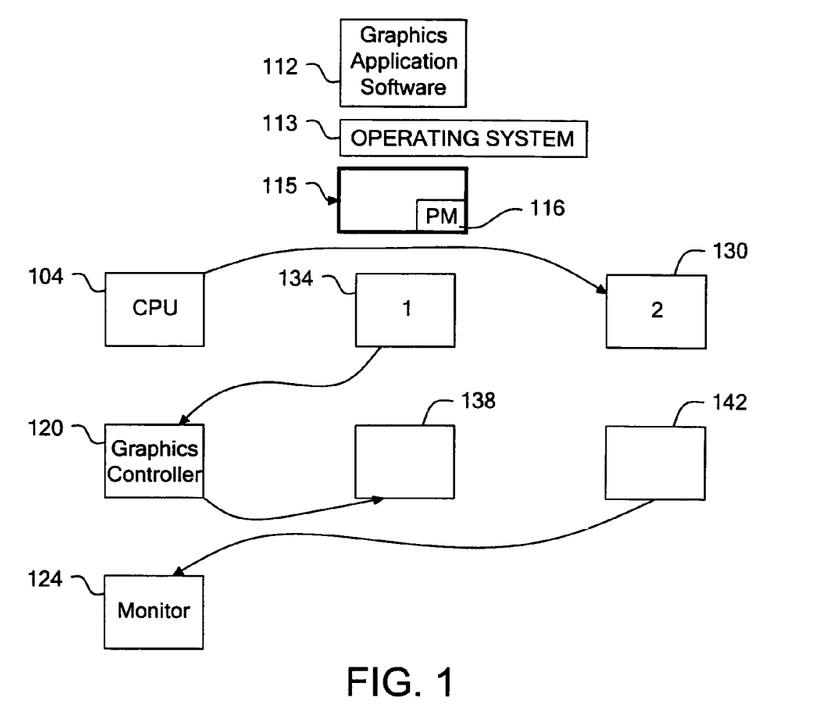
FIG. 1 shows a conceptual diagram of a computer system with double-buffered display capability.

Turning now to FIG. 1, a conceptual block diagram of a double-buffered graphics-processing scheme in a computer system is shown. This example system has a central processing unit (CPU) 104, e.g. having one or more PENTIUM processors by Intel Corp., of Santa Clara, Calif. Data for use by the CPU 104 can be stored in a storage 108, where the storage may constitute different types of machine-readable media such as solid state memory (e.g., dynamic random access memory, static random access memory, or other type of solid state volatile or non-volatile medium), as well as in some embodiments a magnetic rotating disk drive, an optical disk drive, or other mass storage device. The storage 108 has several partitions, including one that stores graphics application software 112, and another that has power management (PM) software 116. The PM software 116 may be part of a driver program 115 or an operating system 113. Such programs are to be accessed and executed by the CPU 104 and/or a graphics controller 120. The graphics controller 120 may be packaged as part of a system interface integrated circuit (also referred to as a system chipset). Alternatively, the graphics controller 120 may be packaged separately such as on a printed circuit board graphics adapter card that communicates with the CPU 104 via the system chipset (not shown).

In the example of FIG. 1, a workload is presented by the graphics application software 112 that is to be executed by the CPU with the help of the graphics controller 120. The workload may include describing a surface (e.g., identifying one or more graphics objects or primitives) in an image, rendering the surface with the help of the graphics controller 120, and then providing a resulting surface for display on the monitor 124. An example of such a process is depicted in FIG. 1, for a double-buffered graphics processing scheme. In such a scheme, there are two storage partitions 130, 134 (or buffers) that have been allocated, each to store a separate image as described by the graphics application software 112. Compare, FIGS. 3 and 4 which refer to a triple buffered scheme with three such partitions.

Returning to FIG. 1, after the CPU 104 has completed its task of defining a first surface and storing the data in the first partition 134, the CPU 104 may switch to the next task which is that of describing a second surface and storing that data in a second partition 130. Meanwhile, the graphics controller 120 can access the first partition 134 to render the surfaces of the image. This rendered image is written to a third partition 138. Meanwhile, a rendered surface for a previous image exists in a fourth partition 142, and can thus be transferred to the monitor 124, while the other operations described above are taking place. Note that once a surface is applied to the monitor 124, this image may need to be refreshed in the monitor 124 at, for example, a rate greater than 60 Hz.

Although the above described sequential approach to graphics processing may allow a relatively high frame rate, that is a relatively high number of frames to be displayed on the monitor 124 per unit time, it may consume a significant portion of the total power in the system. For displaying motion in a scene, expected minimum frame rates range from 10 to 25 frames per second for dx7 quality computer animated images, to between 30 and 60 frames per second for natural scenes. However, other frame rates may also apply. The power management (PM) software 116 provided here is designed to better manage power consumption in such a system, by requesting adjustments to an operating point of the CPU 104 and/or the graphics controller 120 while performing their tasks, based on a deadline margin for real-time demand. The real-time demand may be specified as a target frame rate in the operating system 113, such that all application programs running on top of the operating system may need to always meet the target frame rate, e.g. no skipped frames allowed. Alternatively, the target frame rate may be adjustable as determined or commanded by the application software 112.

The PM software 116 may be executed by the CPU 104, the graphics controller 120, or by some other processor (not shown) of the system, to change the processor clock frequency requirement based on a deadline margin for real-time demand. Another alternative is to provide for hardwired logic circuitry (that may or may not be programmable) that is capable of evaluating the real-time demand of a workload and determining the deadline margin (so as to set the processor clock frequency requirement accordingly). Such hardwired logic may be implemented in the system chipset, a packaged CPU, or other IC component of the system.

Figure 2:
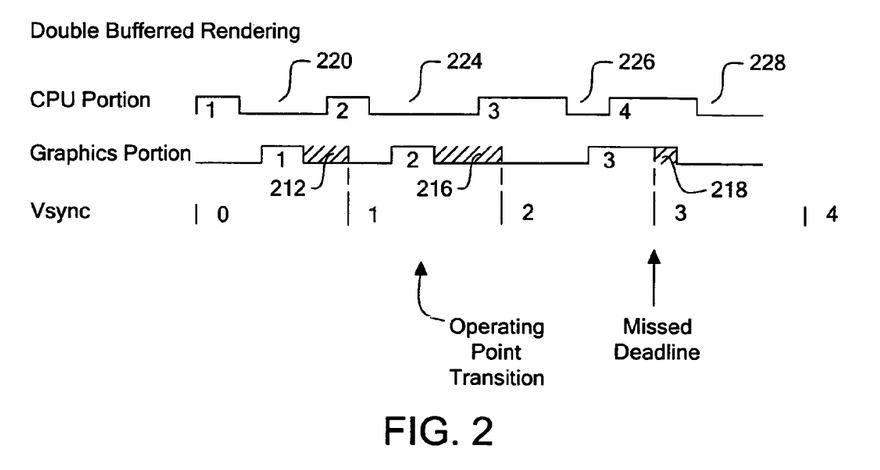
FIG. 2 depicts a timing diagram for double-buffered rendering that may be used for managing power consumption.

Turning now to FIG. 2, this figure depicts an example timing diagram for double-buffered rendering in the system of FIG. 1. This diagram is also used here to explain how power consumption may be managed, according to an embodiment of the invention, using the deadline margin. This timing diagram also illustrates the problem of a missed deadline caused by an incorrectly determined operating point transition. To better understand the timing diagram, assume that a high level goal of the power management technique is to repeatedly make operating point transitions (e.g., set a processor clock frequency requirement) while a processor is performing a given workload, so that an actual deadline margin (while the processor is performing the workload) approaches zero. This should be achieved while trying not to miss any deadline.

Referring now to the waveforms in FIG. 2, the first waveform represents work being done by the CPU portion of the system, so that whenever the waveform is asserted, the CPU is performing some task associated with a given workload. In this example, the numbers 1, 2, 3, . . . refer to the tasks of preparing or describing separate surfaces that are to be rendered. The second waveform refers to the tasks performed by the graphics portion. As in sequential processing, task 1 of the graphics portion uses results of the performance of task 1 by the CPU portion, task 2 of the graphics portion uses results of the performance of task 2 by the CPU portion, and so on. For example, each task of the graphics portion may include rendering a part or all of a separate surface of an image that has been described by the CPU portion. As an alternative, each task may be defined as rendering all surfaces in a single image (where these surfaces were previously computed or defined as another task, by a different processor).

The third row in FIG. 2 indicates the points in time at which a vertical blanking (Vsync) signal is asserted, indicating that a new image should be ready for being actually applied to a monitor. Thus, for the first image, time interval 212 represents the time between completion of the image by the graphics portion and its deadline at Vsync 1, that is the point in time at which the surface for the first image is to be applied to the monitor to be displayed. Similarly, for the second image, time interval 216 represents how close the completion of the task by the graphics portion has come to its deadline (indicated at Vsync 2).

As mentioned above, the timing diagram of FIG. 2 also illustrates a missed deadline, as follows. Note how an operating point transition has occurred at about the time that the graphics portion has completed its task 2. This is a result of a power management algorithm having determined that an operating point transition is needed, namely one that reduces a processor clock frequency for the graphics portion, as well as perhaps for the CPU portion. The transition leads to the performance of task 3 by the CPU portion taking significantly longer than the performance of tasks 1 and 2. In addition, the performance of task 3 by the graphics portion also takes longer than its predecessors. Unfortunately, this change in operating point was too severe and has caused the deadline to be missed at Vsync 3, because, as can be seen in the timing diagram, completion of task 3 for the graphics portion is late by the time interval 218.

To help avoid the missed deadline situation depicted in FIG. 2, an embodiment of the invention requests an adjustment to an operating point of one or both of the CPU portion and graphics portion, based on the time between completion of a task and its deadline. In this case, for a real-time demand being a target frame rate (defined by the time intervals of Vsync 1, 2, . . . ), the time intervals 212 and 216 are examples of deadline margins for tasks 1 and 2 having been met, whereas time interval 218 indicates essentially "negative" deadline margin at task 3. Note that a requested adjustment or operating point transition may be based on actual measurements of the amount of time needed for the CPU portion and/or the graphics portion to complete their respective tasks. Alternatively, the requested adjustment may be based on one or more of the measurements of the time intervals 212, 216 and 218.

The requested requirement for the operating point of a processor can be of different types. For example, a specified operating point may be a value or processor mode of operation that has a predefined clock frequency at which a core of the processor operates. The specified operating point may alternatively be an offset to the frequency of a clock, such as a positive or a negative offset depending upon whether an increase or decrease in performance is desired. Yet another alternative may be to specify the operating point as a direction of increase or decrease in the frequency of a clock, with a predetermined frequency increment.

It should be noted that the change in the operating point may be based not only on the deadline margin for a real-time demand, but also on the expected change (if any) in the workload. For example, in the graphics processing scheme described above, the workload may change rather unexpectedly on a per frame basis, making it difficult to predict in advance how much time is needed to, for instance, specify the surfaces of an image and then render them. However, a good predictor may be the previous frame (except when performing large context switches such as abrupt scene changes). Thus, the following formula may be used to specify the "next" operating point requirement based on a current operating point, for a processor in a graphics processing embodiment:

$$f(n)=f(n-1)*(1-x(n)/T)*S$$

If $f(n)>f\text{max}$, then $f(n)=f\text{max}$

If $f(n)<f\text{min}$, then $f(n)=f\text{min}$ where f(n) is the operating clock frequency following the transition, f(n−1) is the current or previous operating frequency, x(n) is the deadline margin in seconds (for the real-time demand), T is total time to complete the task, and S is a safety factor (a coefficient that serves to make the operating point transition less drastic). The above formula assumes therefore that the operating frequency for the previous frame is a good predictor for the next frame.

Recall once again that an overall goal may be to repeatedly set a processor clock frequency requirement, while a processor is performing a workload, so that an actual deadline margin (while the processor is performing the workload) approaches zero. Ideally, this should be done without missing any deadlines, although in practice this may not always be possible to meet. The goal may thus be to effectively select the lowest possible operating point for the processor that can still meet the demand. It is expected that this goal may be met more easily especially for the sequential processing embodiment where there is more than one processor, by basing the operating point transitions of the processor on deadline margins for real-time demand, rather than based solely on how busy the processor has been.

As mentioned above, for the CPU portion in a graphics processing embodiment, the deadline margin may be an actual measurement of the time between completion by the CPU of identifying one or more graphics surfaces in an image, and the start of rendering these surfaces. Alternatively, the margin may be computed based on an estimate of the time needed by the CPU to identify the graphics surfaces, where this estimate may be obtained from a simulation, rather than by an actual measurement of a manufactured part in operation. Similarly, for the graphics portion, the deadline margin may be a measurement of the time between completion by the graphics portion of rendering an image, and the start of actually displaying the image on the monitor. Such measurements may be made by, for example, designing a rendering engine to write a time stamp value (taken from a free-running hardware counter, for example) to main memory or to a location in a system chipset, that refers to the point in time at which frame rendering was finished. Operating system software or other software such as a graphics driver may compute the time that will be needed (or that is actually spent) by the CPU or by the graphics portion, to perform their respective tasks.

Figure 3:
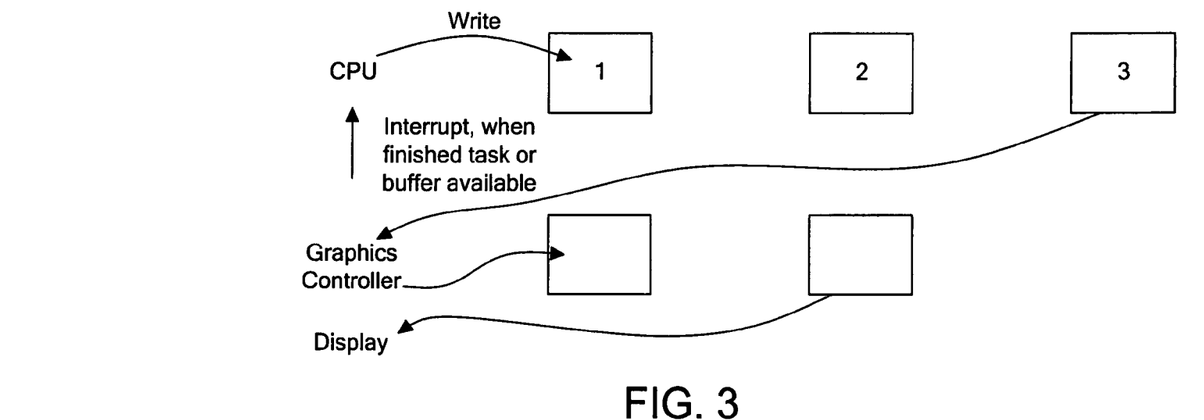
FIG. 3 shows a conceptual diagram of a computer system with triple-buffered display capability.
Figure 4:
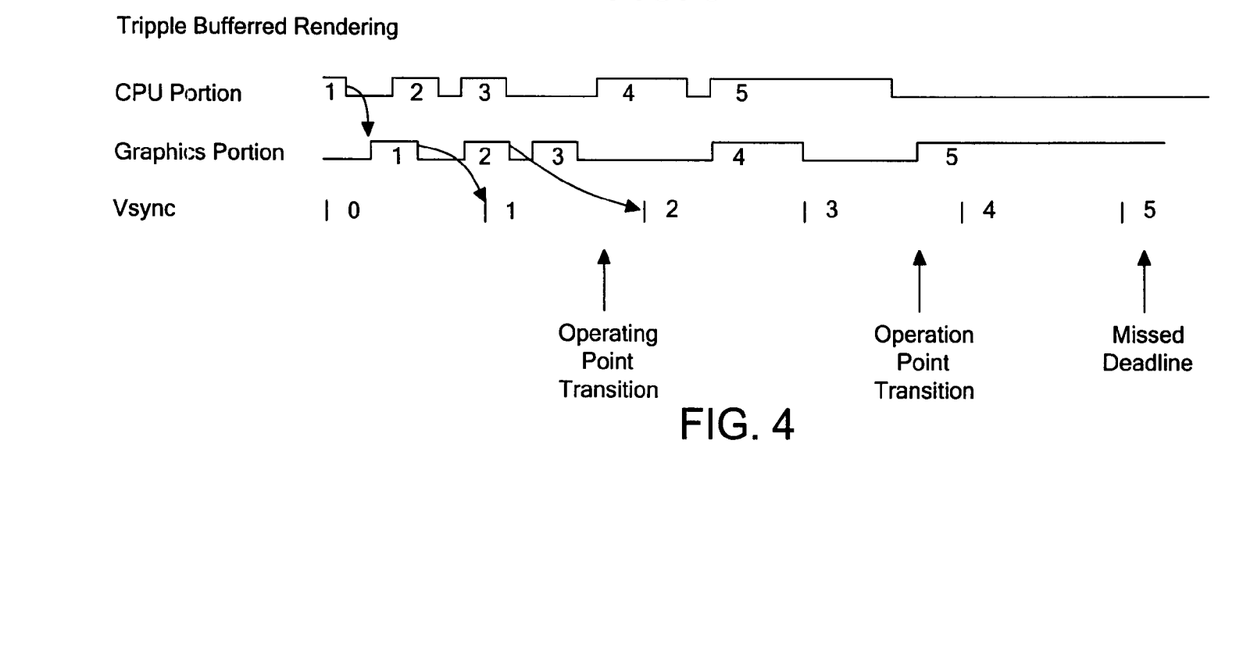
FIG. 4 depicts a timing diagram for triple-buffered rendering that may be used for managing power consumption.

Referring now to FIG. 3, what is shown is a conceptual diagram of a computer system with triple-buffered display capability. In this example, when the CPU is writing the results of its task 1, the graphics controller may be reading the results of an earlier, completed task from a different buffer portion. A third buffer portion is allocated, to allow the graphics controller and the CPU even more flexibility in their performance of their respective tasks; this may further reduce the amount of time either processor spends being idle while waiting for a buffer portion to become available. Although an incorrect implementation of operating point transitions may still result in missed deadlines even in the triple buffering scenario, as seen in the timing diagram of FIG. 4, triple buffering allows greater deadline margins initially, and hence more slack in reducing the processor clock frequency at each transition point.

In the above described embodiments, some mechanism may need to be provided so that the first processor (e.g., the CPU) becomes aware of a re-usable buffer becoming available, after the second processor (e.g., a graphics controller) has completed reading the buffer and has completed its associated task. One such technique may be to provide CPU software that is designed to poll the graphics controller for completion of a particular task. However, while polling, the CPU is typically in its normal or active mode of operation, as compared to a lower power mode, such as Sleep mode. Accordingly, to promote a further reduction in power consumption, an embodiment of the invention is directed to equipping the second processor (e.g., the graphics controller) with the capability to interrupt the first processor once it has finished a given task (thereby making a buffer available for use by the first processor). This may help maintain the CPU in a lower power consumption mode in between the periods of time in which the CPU is performing its tasks. Thus, for example, referring to FIG. 2, the interrupt signaling capability allows the CPU portion to be placed into a lower power consumption mode (e.g., a Sleep mode) in intervals 220, 224, 226, 228, etc. As an alternative, or in addition to such a change, the CPU may, on average, be operated at a lower clock frequency when performing a sequence of graphics tasks, because its polling duties have been significantly reduced.

The interrupt signaling embodiment may be applicable to both the double-buffered and triple-buffered graphics processing scenarios described above. However, In some cases, the CPU may impose a relatively significant interrupt servicing latency, that is a period of time from when an interrupt has been received to actually servicing the interrupt by performing, for example, an interrupt service routine to change tasks or context. Accordingly, the scheduling of tasks for the CPU may need to be "advanced", to provide the graphics controller with enough tasks so that it does not become idle while waiting for the CPU to service its interrupt requests. For example, if graphics has completed a task and thereby made a particular buffer available to the CPU, graphics need not stay idle for too long before another buffer has been made available by the CPU so that graphics can perform its next task. This is an example of where the triple-buffered scenario may be more effective than the double-buffered one.

Figure 5:
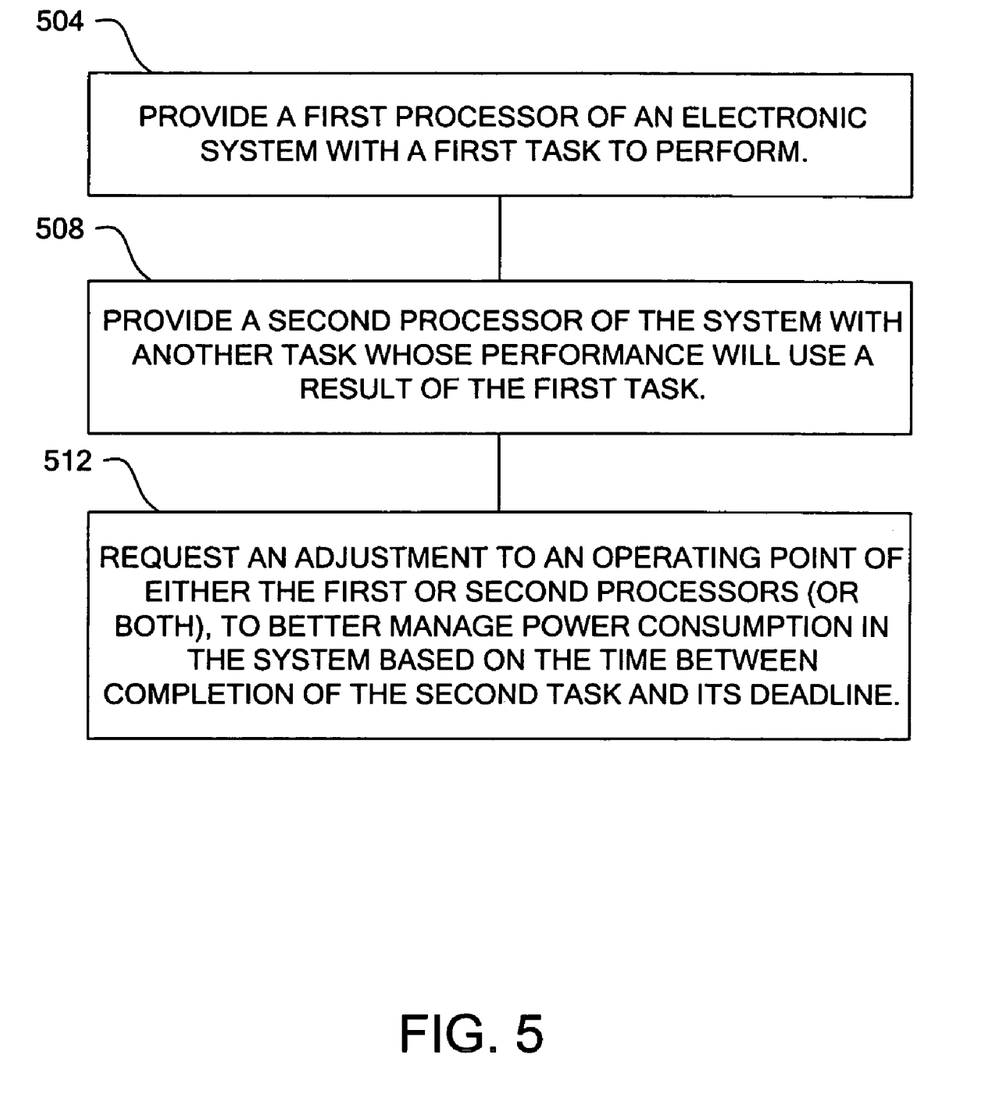
FIG. 5 shows a flow diagram of a method for managing power consumption in an electronic system.

Turning now to FIG. 5, a more general method for managing power consumption in an electronic system is described by means of a flow diagram. This is an example of a sequential processing scheme involving at least first and second processors. Operation begins with providing the first processor with a first task to perform (block 504). A second processor of the system is also provided with another task to perform, where performance of the task by the second processor will use a result of the performance of the first task (block 508). As an example, the tasks may be related to the describing and rendering of images in a video sequence. The tasks for the first processor may be the identification or description of the models for one or more surfaces to be rendered, whereas the tasks for the second processor will involve actually rendering the defined surfaces and creating display images.

Note that the boundaries of each graphics task need not be drawn along entire or complete surfaces. For example, rather than completely defining an entire surface, and then rendering the entire surface, the surface may be defined in parts and then rendered in parts, where each part is defined and then rendered prior to the first and second processors proceeding to the definition and rendering of a subsequent part. This methodology may also be applicable to tasks other than those found in graphics processing.

Referring back to FIG. 5, the flow diagram includes the further operation of requesting an adjustment to an operating point of one or both of the first and second processors (block 512). This is designed to better manage power consumption in the electronic system, that is more efficiently use the performance of the first and second processors for their defined tasks. Rather than basing such adjustments solely on the utilization of the first and/or second processors, an embodiment of the invention is designed to compute or determine these adjustments based at least in part on the time between completion of the second task and its deadline. An example given above was a video/graphics processing scheme having a real-time demand in the form of a target frame rate. Reductions to the processor clock frequency of the CPU and/or the graphics were done based upon the deadline margin for the real-time demand being in that case the period of time remaining from when a particular surface or image has been rendered into an image form and is ready for display, to the point at which the image was scheduled to be applied and shown on a monitor. Other ways of defining the deadline margin for the graphics processing scheme are possible. As suggested above, an overall goal of the methodology may be to reduce the deadline margin gradually to zero, as the video/graphics sequence progresses, while trying not to have too many (or any) dropped frames due to the reduction in processor clock frequency.

Although the power management techniques described above are applicable in a wide range of different types of electronic systems, including for example desktop computer systems and servers, the power consumption benefits of the techniques may be particularly desirable in portable systems that are powered by either a battery or fuel cell which have a limited supply of energy.

Some embodiments of the invention may be provided as a computer program product or software which may include a machine or computer-readable medium having stored thereon instructions which may be used to program a computer (or other electronic devices) to perform a process according to an embodiment of the invention. In other embodiments, operations might be performed by specific hardware components that contain microcode, hardwired logic, or by any combination of programmed computer components and custom hardware components.

A machine-readable medium may be any mechanism that provides, i.e. stores or transmits, information in a form accessible by a machine (e.g., a set of one or more processors, a desktop computer, a portable computer, a manufacturing tool, or any other device that has a processor). E.g., recordable/non-recordable media such as read only memory (ROM), random access memory (RAM), magnetic rotating disk storage media, optical disk storage media, as well as electrical, optical, acoustical or other form of propagated signals (e.g., carrier waves, infrared signals, etc.)

To summarize, various embodiments of a technique for managing power consumption have been described. In the foregoing specification, the invention has been described with reference to specific exemplary embodiments thereof. It will, however, be evident that various modifications and changes may be made thereto without departing from the broader spirit and scope of the invention as set forth in the appended claims. For instance, a given example of adjustments in the operating points of a processor was a reduction or increase in the processor clock frequency; this frequency change may be accompanied by a change in the supply voltage of the processor to further reduce power consumption. The specification and drawings are, accordingly, to be regarded in an illustrative rather than a restrictive sense.

What is claimed is:

1. A method for managing power consumption in an electronic system, comprising:
providing a first processor of the system with a first task to perform;
providing a second processor of the system with a second task to perform, wherein performance of the second task will use a result of performance of the first task;
requesting an adjustment to an operating point of one of the first and second processors to better manage power consumption in the electronic system, based on a time between completion of the second task and its deadline; and
signaling of an interrupt to the first processor by the second processor upon completion of the second task, wherein a clock speed of the first processor is repeatedly set while the first processor is performing a sequence of graphics tasks such that an actual deadline margin approaches zero.

2. The method of claim 1 wherein the requested adjustment is to decrease a frequency of a processor clock if said time indicates that the deadline was met.

3. The method of claim 1 wherein the requested adjustment is to increase a frequency of a processor clock if said time indicates that the deadline was not met.

4. The method of claim 1 wherein the first task relates to describing images and the second tasks relates to rendering images, the method further comprising computing the deadlines of the first and second tasks based on a target frame rate for displaying images.

5. The method of claim 1 further comprising measuring an amount of time needed for the first processor to complete the first task and the amount of time needed for the second processor to complete the second task, wherein the requested adjustment is based on said measurements.

6. A method comprising:
providing a first processor with a workload that has a real-time demand; and
setting a processor clock frequency requirement for the first processor based on a deadline margin for the real-time demand, wherein the deadline margin is a measurement of a time between (i) completion by the first processor of identifying one or more graphics surfaces in an image, and (ii) a start of rendering the one or more graphics surfaces wherein the first processor receives an interrupt from a second processor upon completion of the rendering the one or more graphics surfaces by the second processor, wherein a clock speed of the first processor is repeatedly set while the first processor is performing a sequence of graphics tasks such that the deadline margin approaches zero.

7. The method of claim 6 wherein the real-time demand is a target frame rate for displaying image frames.

8. The method of claim 7 wherein a second deadline margin is a measurement of a time between (i) completion by the second processor of rendering an image, and (ii) a start of displaying the image.

9. The method of claim 7 wherein a second deadline margin is computed based on (i) an estimate of a time needed by the second processor to render an image, and (ii) the target frame rate.

10. A system comprising:
a central processing unit (CPU);
a graphics controller coupled to the CPU;

a monitor coupled to the graphics controller; and memory containing instructions that, when executed by the CPU, (i) identify models of surfaces to be rendered in an image, wherein the image is to be rendered by the graphics controller and then displayed on the monitor in accordance with a target frame rate, and (ii) specify an operating point for one of the CPU and graphics controller, based on a deadline margin for the target frame rate, wherein the graphics controller signals an interrupt to the CPU upon completion of at least one of rendering of the image and displaying of the image on the monitor, wherein a clock speed of the CPU is repeatedly set while the CPU is performing a sequence of graphics tasks such that the deadline margin approaches zero.

11. The system of claim 10 wherein the operating point is a value that represents one of (i) a clock frequency, (ii) an offset to the clock frequency, and (iii) a direction of increase or decrease in the clock frequency.

12. The system of claim 10 wherein the instructions, when executed by the CPU, specify the operating point of the graphics controller based on a time between when a rendering task is finished by the graphics controller and a deadline of the task.

13. The system of claim 12 wherein the instructions, when executed by the CPU, specify the operating point of the CPU based on a time taken by the CPU to finish specifying mathematical models of graphics objects in an image and a time taken by the graphics controller to render the image.

14. The system of claim 10 wherein the instructions, when executed by the CPU, specify the operating points for the CPU and the graphics controller, based on values recorded in the system that represent an actual elapsed time needed to completely render an image by the graphics controller and an actual elapsed time needed to complete an identification of models of graphics objects in said image by the processor.

15. The system of claim 10 wherein the operating point is one of a high performance mode and a low performance mode for the CPU.

16. The system of claim 15 wherein in the high performance mode, the CPU operates at a higher clock frequency and at a higher supply voltage than in the low performance mode.

17. An article of manufacture comprising:

a computer-readable storage device which has data that, when accessed by a processor, requests an operating point requirement for a target processor to (i) reduce power consumption by the target processor while the target processor performs a workload and (ii) meet a plurality of completion deadlines for a plurality of tasks in the workload, wherein the operating point requirement is based on an elapsed time between completion of a task and its deadline, and wherein the target processor signals an interrupt to the processor upon completion of at least one of the plurality of tasks, wherein a clock speed of the processor is repeatedly set while the processor is performing a sequence of graphics tasks such that an actual deadline margin approaches zero.

18. The article of manufacture of claim 17 wherein the data is to define the operating point requirement as a decrease in a frequency of an operating clock for the processor.

19. The article of manufacture of claim 17 wherein the data is part of a computer operating system program.

20. The article of manufacture of claim 17 wherein the data is part of a computer system driver program.

* * * * *

UNITED STATES PATENT AND TRADEMARK OFFICE
CERTIFICATE OF CORRECTION

| | | |
|---|---|---|
| PATENT NO. | : 7,698,575 B2 | Page 1 of 1 |
| APPLICATION NO. | : 10/814425 | |
| DATED | : April 13, 2010 | |
| INVENTOR(S) | : Eric C. Samson | |

It is certified that error appears in the above-identified patent and that said Letters Patent is hereby corrected as shown below:

In column 8, line 30, in claim 4, delete "tasks" and insert -- task --, therefor.

Signed and Sealed this

Twenty-ninth Day of June, 2010

David J. Kappos
*Director of the United States Patent and Trademark Office*